(12) United States Patent
Koseoglu (10) Patent No.: US 9,546,328 B2
(45) Date of Patent: Jan. 17, 2017

(54) HYDROTREATING OF AROMATIC-EXTRACTED HYDROCARBON STREAMS

(75) Inventor: Omer Refa Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 946 days.

(21) Appl. No.: 13/559,806

(22) Filed: Jul. 27, 2012

(65) Prior Publication Data

US 2013/0062255 A1 Mar. 14, 2013

Related U.S. Application Data

(60) Provisional application No. 61/513,184, filed on Jul. 29, 2011.

(51) Int. Cl.
*C10G 45/58* (2006.01)
*C10G 25/00* (2006.01)
(Continued)

(52) U.S. Cl.
CPC ........... *C10G 45/58* (2013.01); *C10G 25/00* (2013.01); *C10G 65/00* (2013.01); *C10G 65/043* (2013.01);
(Continued)

(58) Field of Classification Search
CPC ......... C10G 69/02; C10G 65/12; C10G 21/12; C10G 67/06; C10G 67/0436; C10G 67/0418; C10G 25/00; C10G 65/043; B01D 11/0457; B01D 11/043; B01D 11/0461; B01D 17/047; B01D 17/0202; B01D 17/041
See application file for complete search history.

(56) References Cited

U.S. PATENT DOCUMENTS 2,799,627 A * 7/1957 Haensel ............. C10G 67/0409
                                                    208/144
4,173,529 A * 11/1979 Bauer .......................... 208/255
(Continued)

FOREIGN PATENT DOCUMENTS

WO      2005056728 A2      6/2005

OTHER PUBLICATIONS

Hansford et al, The Nature of Active Sites on Zeolites, Jounal of Catalysis, 316-320.*
(Continued)

*Primary Examiner* — Randy Boyer
*Assistant Examiner* — Juan Valencia
(74) *Attorney, Agent, or Firm* — Abelman, Frayne & Schwab (57) ABSTRACT

Deep desulfurization of hydrocarbon feeds containing undesired organosulfur compounds to produce a hydrocarbon product having low levels of sulfur, i.e., 15 ppmw or less of sulfur, is achieved by first subjecting the entire feed to an extraction zone to separate an aromatic-rich fraction containing a substantial amount of the aromatic refractory and sterically hindered sulfur-containing compounds and an aromatic-lean fraction containing a substantial amount of the labile sulfur-containing compounds. The aromatic-rich fraction is contacted with isomerization catalyst, and the isomerized aromatic-rich fraction and the aromatic-lean fraction are combined and contacted with a hydrotreating catalyst in a hydrodesulfurization reaction zone operating under mild conditions to reduce the quantity of organosulfur compounds to an ultra-low level.

11 Claims, 8 Drawing Sheets

(51) Int. Cl.
| | |
|---|---|
| *C10G 65/00* | (2006.01) |
| *C10G 65/04* | (2006.01) |
| *C10G 65/16* | (2006.01) |
| *C10G 67/00* | (2006.01) |
| *C10G 67/06* | (2006.01) |
| *C10G 67/16* | (2006.01) |

(52) U.S. Cl.
CPC ............... *C10G 65/16* (2013.01); *C10G 67/00* (2013.01); *C10G 67/06* (2013.01); *C10G 67/16* (2013.01); *C10G 2300/1059* (2013.01); *C10G 2300/1096* (2013.01); *C10G 2300/202* (2013.01); *C10G 2300/301* (2013.01); *C10G 2300/44* (2013.01)

(56) References Cited

U.S. PATENT DOCUMENTS

| | | |
|---|---|---|
| 4,359,596 A | 11/1982 | Howard et al. |
| 4,447,315 A | 5/1984 | Lamb et al. |
| 4,592,832 A | 6/1986 | Bristow et al. |
| 4,851,109 A | 7/1989 | Chen et al. |
| 4,909,927 A | 3/1990 | Bell |
| 5,004,853 A | 4/1991 | Barger et al. |
| 5,011,593 A | 4/1991 | Ware et al. |
| 5,021,143 A | 6/1991 | Franckowiak et al. |
| 5,110,445 A | 5/1992 | Chen et al. |
| 5,124,023 A | 6/1992 | Bosserman et al. |
| 5,190,633 A | 3/1993 | Fetzer et al. |
| 5,290,427 A | 3/1994 | Fletcher et al. |
| 5,409,599 A | 4/1995 | Harandi |
| 5,536,391 A | 7/1996 | Howley et al. |
| 5,880,325 A | 3/1999 | Alward et al. |
| 5,897,768 A * | 4/1999 | McVicker et al. ............ 208/215 |
| 6,113,775 A | 9/2000 | Christolini et al. |
| 6,171,478 B1 | 1/2001 | Cabrera et al. |
| 6,248,230 B1 | 6/2001 | Min et al. |
| 6,638,419 B1 * | 10/2003 | Da Silva et al. ......... 208/208 R |
| 6,676,829 B1 | 1/2004 | Angevine et al. |
| 6,866,772 B2 | 3/2005 | Selai et al. |
| 6,929,738 B1 | 8/2005 | Riley et al. |
| 7,374,666 B2 | 5/2008 | Wachs |
| 7,431,827 B2 | 10/2008 | Rock et al. |
| 7,731,838 B2 | 6/2010 | McConnachie et al. |
| 7,794,585 B2 * | 9/2010 | Leonard et al. ................ 208/89 |
| 2004/0035752 A1 | 2/2004 | Marchal-George et al. |
| 2005/0218039 A1 * | 10/2005 | Kalnes .......................... 208/210 |
| 2008/0093260 A1 | 4/2008 | Koseoglu |
| 2008/0105595 A1 | 5/2008 | Koseoglu |
| 2008/0116112 A1 | 5/2008 | Umansky et al. |
| 2008/0308463 A1 | 12/2008 | Keckler et al. |
| 2009/0065398 A1 | 3/2009 | McConnachie et al. |
| 2009/0084709 A1 | 4/2009 | Choi |
| 2009/0107890 A1 | 4/2009 | Hamad et al. |
| 2009/0145807 A1 | 6/2009 | Choi et al. |
| 2012/0024751 A1 * | 2/2012 | He et al. ........................ 208/57 |

OTHER PUBLICATIONS

Song, New Approaches to Deep Desulfurization for Ultra-Clean Gasoline and Diesel Fuels: An Overview, 2002, Fuel Chemistry Division Prepoints, 47 (2) 438-444.*
Hansford, Roland C., Ward, John W., "The Nature of Active Sites on Zeolites, VII. Relative Activities of Crystalline and Amorphous Alumino-Silicates", Journal of Catalysis, vol. 13, (1969), 316-320.
Isoda, Takaai, Nagao, Shinichi, Ma, Xiaoliang, Korai, Yozo, Mochida, Isao "Hydrodesulfurization Pathway of 4,6-Dimethyldibenzothiophene through Isomerization over Y-Zeolite Containing CoMo/Al2O3 Catalyst." Energy Fuels, 1996, 10, 1078-1082.
Isoda, Takaai, Takase, Yoyoto, Kusakabe, Katsuki, Morooka, Shigeharu. "Changes in Desulfurization Reactivity of 4,6-Dimethyldibenzothiophene by Skeletal Isomerization Using a Ni-Supported Y-Type Zeolite." Energy Fuels, 2000, vol. 14, 585-590.
M.V. Landau et al., "Tail-Selective Hydrocracking of Heavy Gas Oil in Diesel Production." Studies in Surface Science and Catalysis, vol. 106, 1997, 371-378.
Petr Steiner et al., "Catalytic hydrodesulfurization of a light gas oil over a NiMo catalyst: kinetics of selected sulfur components." Fuel Processing Technology, vol. 79, Issue 1, Aug. 2, 2002, 1-12.
Ruixiang Hua et al., "Determination of sulfur-containing compounds in diesel oils by comprehensive two-dimensional gas chromatography with a sulfur chemiluminescence detector." Journal of Chromatography, vol. 1019, Issues 1-2, Nov. 2003, 101-109.
International Search Report and Written Opinion, PCT/US2012/048463, May 7, 2013 (13 pages).

* cited by examiner

HYDROTREATING OF AROMATIC-EXTRACTED HYDROCARBON STREAMS

RELATED APPLICATIONS

This application claims priority to provisional patent application U.S. Ser. No. 61/513,184 filed Jul. 29, 2011, the contents of which are incorporated herein by reference.

BACKGROUND OF THE INVENTION

Field of the Invention

The present invention relates to hydrotreating processes to efficiently reduce the sulfur content of hydrocarbons.

Description of Related Art

The discharge into the atmosphere of sulfur compounds during processing and end-use of the petroleum products derived from sulfur-containing sour crude oil poses health and environmental problems. Stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In the industrialized nations such as the United States, Japan and the countries of the European Union, refineries have already been required to produce environmentally clean transportation fuels. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the footsteps of the United States and the European Union and are moving forward with regulations that will require refineries to produce transportation fuels with ultra-low sulfur levels.

To keep pace with recent trends toward production of ultra-low sulfur fuels, refiners must choose among the processes or crude oils that provide flexibility that ensures future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, represent a substantial prior investment and were constructed before these more stringent sulfur reduction requirements were enacted. It is very difficult to upgrade existing hydrotreating reactors in these facilities because of the comparatively more severe operational requirements (i.e., higher temperature and pressure) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3000 ppmw sulfur. These units were designed for, and are being operated at, relatively mild conditions (i.e., low hydrogen partial pressures of 30 kilograms per square centimeter for straight run gas oils boiling in the range of 180° C. to 370° C.).

With the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by incorporating gas purification systems, reengineering the internal configuration and components of reactors, and/or deployment of more active catalyst compositions.

Sulfur-containing compounds that are typically present in hydrocarbon fuels include aliphatic molecules such as sulfides, disulfides and mercaptans as well as aromatic molecules such as thiophene, benzothiophene and its long chain alkylated derivatives, and dibenzothiophene and its alkyl derivatives such as 4,6-dimethyl-dibenzothiophene.

Aliphatic sulfur-containing compounds are more easily desulfurized (labile) using mild hydrodesulfurization methods. However, certain highly branched aromatic molecules can sterically hinder the sulfur atom removal and are moderately more difficult to desulfurize (refractory) using mild hydrodesulfurization methods.

Among the sulfur-containing aromatic compounds, thiophenes and benzothiophenes are relatively easy to hydrodesulfurize. The addition of alkyl groups to the ring compounds increases the difficulty of hydrodesulfurization. Dibenzothiophenes resulting from addition of another ring to the benzothiophene family are even more difficult to desulfurize, and the difficulty varies greatly according to their alkyl substitution, with di-beta substitution being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level is very costly by current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

Figure 1:
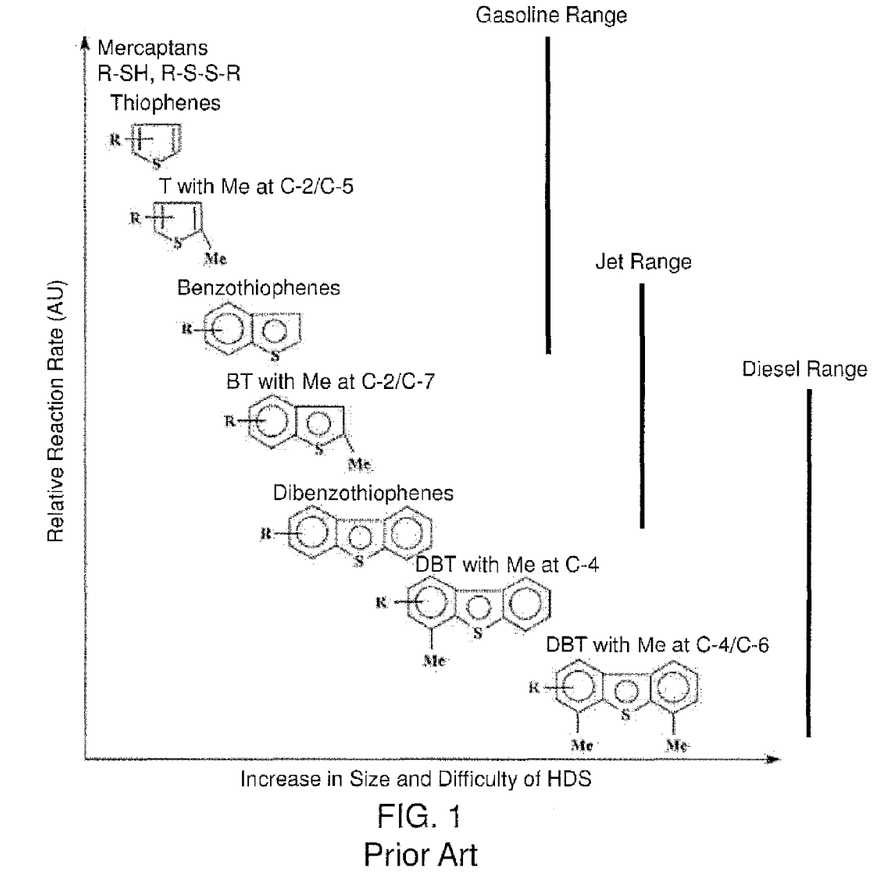
FIG. 1 is a relative reactivity chart showing relative reactivities of various compounds in the hydrodesulfurization process with the increase in size of the sulfur-containing molecule.

The relative reactivity of thiols and sulfides are much higher than those of aromatic sulfur compounds, as indicated in a study published in Song, Chunshan, "An Overview of New Approaches to Deep Desulfurization for Ultra-Clean Gasoline, Diesel Fuel and Jet Fuel," *Catalysis Today*, 86 (2003), pp. 211-263. Mercaptans/thiols and sulfides are much more reactive than the aromatic sulfur compounds. It should be noted that non-thiophenic sulfides such as paraffinic and/or naphthenic are present in diesel range hydrocarbons as seen from the relative reactivity chart shown in FIG. 1.

Studies have been conducted related to increasing the relative reactivity of sterically hindered sulfur-containing hydrocarbons. In particular, isomerization of 4,6-dimethyl-dibenzothiophene into methyl-migrated isomers and tri- or tetramethyl-dibenzothiophenes was studied. See Isoda et al., "Hydrodesulfurization Pathway of 4,6-Dimethyldibenzothiophene Through Isomerization over Y-Zeolite Containing CoMo/Al$_2$O$_3$ Catalyst", *Energy & Fuels*, 1996, 10, 1078-1082, and Isoda et al., "Changes in Desulfurization Reactivity of 4,6-Dimethyldibenzothiophene by Skeletal Isomerization Using a Ni-Supported Y-Type Zeolite," *Energy & Fuels*, 2000, 14, 585-590.

McConnachie, et al. U.S. Pat. No. 7,731,838 describes a process in which a diesel boiling range feedstream which includes nitrogen-containing compounds and hindered dibenzothiophenes is subjected to removal of nitrogen-containing compounds by contacting the feedstream with a sulfuric acid solution, contacting the reduced nitrogen stream with a solid acid catalyst to isomerize certain sulfur-containing molecules; and hydrotreating the isomerized effluent. However, the described process in McConnachie, et al. prefers that the entire feed is both subjected to the removal of nitrogen-containing compounds by contacting the feedstream with a sulfuric acid solution, and contacted with the costly and sensitive (i.e., easily poisoned) solid acid isomerization catalyst. This requires that the nitrogen-removal apparatus have a capacity suitable for the entire feedstream, and impart excessive demand on this isomerization catalyst and its reactor capacity.

McVicker, et al. U.S. Pat. No. 5,897,768 teaches a desulfurization process in which an entire feedstream is hydrotreated using conventional catalysts. The partially hydrotreated effluent is fractionated, whereby sterically hindered sulfur-containing hydrocarbons are removed with the bottoms stream. The bottoms stream is passed to a reactor containing isomerization catalyst. The effluent from the reactor containing isomerization catalyst is returned to the hydrotreating reactor. However, in McVicker, et al., the entire initial feed is passed through the hydrotreating reactor, including refractory sulfur-containing hydrocarbons which are likely not desulfurized in this initial pass-through, thus decreasing the overall process efficiency.

None of the above-mentioned references describe processes for desulfurization of including specific sub-processes and apparatus for targeting different organosulfur compounds. With the steady increase in demand for hydrocarbon fuels having an ultra-low sulfur level, a need exists for an efficient and effective process and apparatus for desulfurization.

SUMMARY OF THE INVENTION

Accordingly, it is an object of the present invention to desulfurize a hydrocarbon fuel stream containing different classes of sulfur-containing compounds having different reactivities.

In accordance with one or more embodiments, the invention relates to a system and method of hydrotreating hydrocarbon feedstocks to efficiently reduce the sulfur content.

In accordance with one or more embodiments, an integrated process for treating a feedstock to reduce the concentration of undesired organosulfur compounds is provided. The method comprises:

a. separating the initial hydrocarbon feedstock in an aromatic-lean fraction that contains labile organosulfur compounds and an aromatic-rich fraction that contains refractory aromatic organosulfur compounds;

b. contacting the aromatic-rich fraction with an isomerization catalyst in the presence of hydrogen to remove steric hindrance of certain compounds and produce an isomerized effluent including isomerate and any remaining unreacted hydrogen;

c. subjecting the aromatic-lean fraction and the isomerized effluent to a mild hydrotreating process to thereby reduce the sulfur content; and d. recovering a hydrotreated hydrocarbon product.

Unlike typical known methods, the present process separates the initial feedstock into fractions containing different classes of compounds with different reactivities relative to the conditions of hydrotreating. Conventionally, most approaches subject the entire feedstock to the same hydrotreating reaction zones, necessitating operating conditions that must accommodate feed constituents that require increased severity for conversion, or alternatively sacrifice overall yield to attain desirable process economics.

As used herein, the terms "hydrotreating" and "hydrodesulfurizing," as well as variants of these terms, may be used interchangeably.

As used herein, the term "labile organosulfur compounds" means organosulfur compounds that can be easily desulfurized under relatively mild hydrodesulfurization pressure and temperature conditions, and the term "refractory organosulfur compounds" means organosulfur compounds that are relatively more difficult to desulfurize under mild hydrodesulfurization conditions.

Additionally, as used herein, the terms "mild hydrotreating," "mild operating conditions" and "mild conditions" (when used in reference to hydrotreating or hydrodesulfurization) means hydrotreating processes operating at temperatures of 400° C. and below, hydrogen partial pressures of 40 bars and below, and hydrogen feed rates of 500 standard liters per liter of oil and below.

Since aromatic extraction operations typically do not provide sharp cut-offs between the aromatics and non-aromatics, the aromatic-lean fraction contains a major proportion of the non-aromatic content of the initial feed and a minor proportion of the aromatic content of the initial feed (e.g., a certain portion of the thiophene in the initial feed and short chain alkyl derivatives), and the aromatic-rich fraction contains a major proportion of the aromatic content of the initial feed and a minor proportion of the non-aromatic content of the initial feed. The amount of non-aromatics in the aromatic-rich fraction, and the amount of aromatics in the aromatic-lean fraction, depend on various factors as will be apparent to one of ordinary skill in the art, including the type of extraction, the number of theoretical plates in the extractor (if applicable to the type of extraction), the type of solvent and the solvent ratio.

The feed portion that is extracted into the aromatic-rich fraction includes aromatic compounds that contain heteroatoms and those that are free of heteroatoms. Aromatic compounds that pass to the aromatic-rich fraction include aromatic organosulfur compounds, such as a certain portion of the thiophene content from the feed, long chain alkylated derivatives of thiophene, benzothiophene, alkylated derivatives of benzothiophene, dibenzothiophene, alkyl derivatives of dibenzothiophene such as sterically hindered 4,6-dimethyl-dibenzothiophene, benzonaphtenothiophene, and alkyl derivatives of benzonaphtenothiophene. Aromatic compounds that pass to the aromatic-rich fraction also include aromatic nitrogen compounds such as pyrrole, quinoline, acridine, carbazoles and their derivatives. These nitrogen- and sulfur-containing aromatic compounds are targeted in the aromatic separation step(s) generally by their solubility in the extraction solvent. In certain embodiments, selectivity of the nitrogen- and sulfur-containing aromatic compounds is enhanced by use of additional stages and/or selective sorbents. Various non-aromatic organosulfur compounds that may have been present in the initial feed, i.e., prior to hydrotreating, include mercaptans, sulfides and disulfides. Depending on the aromatic extraction operation type and/or condition, a preferably very minor portion of non-aromatic nitrogen- and sulfur-containing compounds can pass to the aromatic-rich fraction.

As used herein, the term "major proportion of the non-aromatic compounds" means at least greater than 50 weight % (W %) of the non-aromatic content of the feed to the extraction zone, in certain embodiments at least greater than about 85 W %, and in further embodiments greater than at least about 95 W %. Also as used herein, the term "minor proportion of the non-aromatic compounds" means no more than 50 W % of the non-aromatic content of the feed to the extraction zone, in certain embodiments no more than about 15 W %, and in further embodiments no more than about 5 W %.

Also as used herein, the term "major proportion of the aromatic compounds" means at least greater than 50 W % of the aromatic content of the feed to the extraction zone, in certain embodiments at least greater than about 85 W %, and in further embodiments greater than at least about 95 W %. Also as used herein, the term "minor proportion of the aromatic compounds" means no more than 50 W % of the aromatic content of the feed to the extraction zone, in certain embodiments no more than about 15 W %, and in further embodiments no more than about 5 W %.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The foregoing summary as well as the following detailed description will be best understood when read in conjunction with the attached drawings. It should be understood, however, that the invention is not limited to the precise arrangements and apparatus shown. In the drawings the same or similar numerals are used to identify the same or similar elements, in which.

DETAILED DESCRIPTION OF THE INVENTION

The above objects and further advantages are provided by the apparatus and process for desulfurization of hydrocarbon feeds containing both refractory and labile organosulfur compounds. The feed is separated in an aromatic separation zone into an aromatic-rich fraction and an aromatic-lean fraction. The aromatic-lean fraction is hydrotreated under mild operating conditions to obtain a desulfurized aromatic-lean fraction. The aromatic-rich fraction, in certain embodiments after adsorption to remove nitrogen-containing compounds, is passed to a reactor containing isomerization catalyst. The isomerized aromatic-rich fraction is returned to the hydrotreating reactor for further hydrodesulfurization.

The integrated system and process is capable of efficiently and cost-effectively reducing the organosulfur content of hydrocarbon fuels. Deep desulfurization of hydrocarbon fuels effectively optimizes use of integrated apparatus and processes, combining mild hydrotreating, aromatic separation and catalytic isomerization. Refiners can use existing hydrotreating refinery unit operations under relatively mild operating conditions.

The inclusion of an aromatic separation zone in an integrated system and process combining hydrodesulfurization and catalytic isomerization allows a partition of the different classes of sulfur-containing compounds according to their respective reactivity factors, thereby optimizing and economizing mild hydrotreating and catalytic isomerization unit operations. The volumetric/mass flow through the catalytic isomerization zone is reduced, since its influent is limited to the aromatic-rich fraction of the initial feed. As a result, the requisite equipment capacity, and accordingly both the capital equipment cost and the operating costs, are minimized.

Furthermore, product quality is improved by the integrated process herein since undesired side reactions associated with catalytic isomerization of the non-aromatic portion of the hydrotreated effluent including labile hydrocarbons using solid acid catalysts are avoided.

In accordance with one or more embodiments, the invention relates to systems and methods of hydrotreating hydrocarbon feedstocks to produce clean hydrocarbon fuels with an ultra-low level of sulfur. An integrated hydrotreating process includes mild hydrotreating of an aromatic-lean fraction of the initial feed, and an aromatic-rich fraction that has been subjected to isomerization reactions. The integrated desulfurization process includes:

a. subjecting the initial hydrocarbon feedstock to an aromatic extraction zone to obtain an aromatic-lean fraction and an aromatic-rich fraction, which contain different classes of organosulfur compounds having different reactivities when subjected to mild hydrotreating processes;

b. organosulfur compounds in the aromatic-lean fraction are primarily labile organosulfur compounds, including aliphatic molecules such as sulfides, disulfides, mercaptans, and this fraction is directly passed to a hydrotreating zone operating under mild conditions to remove the organosulfur compounds; and c. the aromatic-rich fraction, which contains organosulfur compounds that are primarily refractory organosulfur compounds, including aromatic molecules such as certain benzothiophenes (e.g., long chain alkylated benzothiophenes), dibenzothiophene and alkyl derivatives such as sterically hindered 4,6-dimethyldibenzothiophene, is passed to an isomerization reaction zone to convert sterically hindered refractory organosulfur compounds into isomers which are more reactive to hydrotreating under mild operating conditions, and the isomerized effluent is recycled to the mild hydrotreating process.

In hydrocarbon feeds that contain an undesirably high level of nitrogen-containing compounds, and in certain feeds undesirably high levels of polynuclear aromatic compounds, the aromatic-rich fraction is contacted with an adsorbent material prior to entering the isomerization reaction zone.

Figure 2:
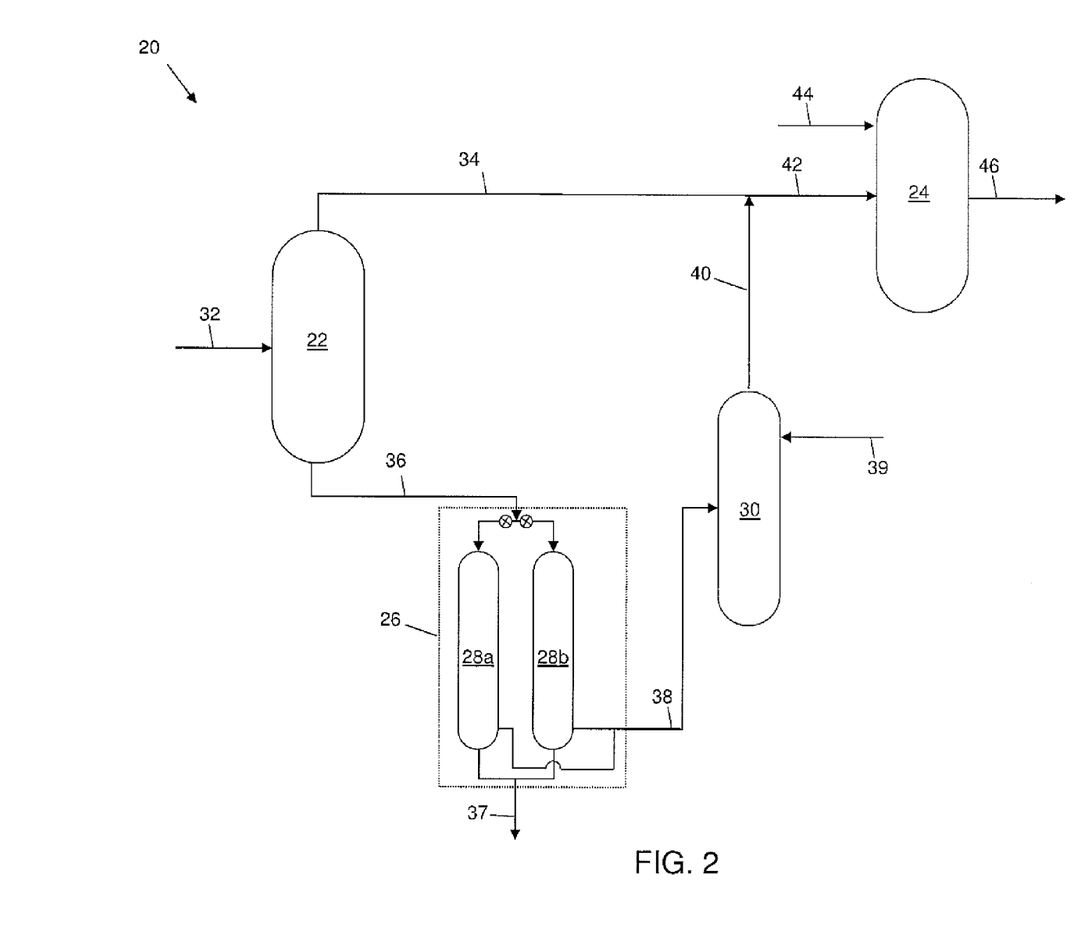
FIG. 2 is a schematic diagram of an integrated desulfurization system and process.

Referring to FIG. 2, an integrated desulfurization apparatus 20 is schematically illustrated. Apparatus 20 includes an aromatic separation zone 22, a hydrotreating or hydrodesulfurization reaction zone 24, an adsorption zone 26 and an isomerization reaction zone 30. Aromatic separation zone 22 includes a feed inlet 32, an aromatic-lean outlet 34 and an aromatic-rich outlet 36. Various embodiments of unit operations contained within aromatic separation zone 22 are detailed further herein in conjunction with FIGS. 3-9.

Note that while the embodiment of apparatus 20 described herein includes an adsorption zone, alternative embodiments similar to apparatus 20 can be practiced without the adsorption zone. For instance, certain feedstreams can be processed which contain sufficiently low levels of nitrogen and/or polynuclear aromatic compounds such that the isomerization catalyst in isomerization reaction zone 30 is not poisoned at an unacceptable rate.

Hydrodesulfurization reaction zone 24 includes an inlet 42 in fluid communication with aromatic-lean outlet 34, a hydrogen gas inlet 44 and a desulfurized product outlet 46.

Adsorption zone 26 includes inlets to adsorption units 28a and 28b in selective fluid communication with aromatic-rich outlet 36, e.g., via one or more valves in a swing mode system, an outlet 38 in fluid communication with an inlet to the isomerization reaction zone 30 and a discharge stream outlet 37.

Isomerization reaction zone 30 includes an inlet in fluid communication with outlet 38 of adsorption zone 26, a hydrogen gas inlet 39 and an isomerized hydrocarbon outlet 40 in fluid communication with inlet 42 of hydrodesulfurization reaction zone 24.

A hydrocarbon feedstream is introduced via inlet 32 of aromatic separation zone 22 to be separated into an aromatic-lean stream discharged via an aromatic-lean outlet 34 and an aromatic-rich stream discharged from an aromatic-rich outlet 36.

The aromatic-lean fraction contains a major proportion of the non-aromatic content of the initial feed and contains labile organosulfur and organonitrogen compounds, and a minor proportion of the aromatic content of the initial feed. The aromatic-lean fraction is almost free of refractory sulfur- and nitrogen-containing compounds, and the aromatic-rich fraction contains sulfur- and nitrogen-containing aromatic compounds. The aromatic-lean fraction is passed to inlet 42 of hydrotreating reaction zone 24 and into contact with a hydrodesulfurization catalyst and hydrogen via inlet 44.

The aromatic-rich fraction from the aromatic extraction zone 22 generally includes a major proportion of the aromatic content of the initial feedstock and a minor proportion of the non-aromatic content of the initial feedstock. Aromatic nitrogen-containing compounds that are extracted into the aromatic-rich fraction include pyrrole, quinoline, acridine, carbazole and their derivatives. Aromatic sulfur-containing compounds that are extracted into the aromatic-rich fraction include thiophene, benzothiophene and its long chain alkylated derivatives, and dibenzothiophene and its alkyl derivatives such as 4,6-dimethyl-dibenzothiophene.

The aromatic-rich fraction is conveyed to an inlet of adsorption zone 26 to reduce the concentration of certain contaminants including nitrogen-containing compounds and in certain embodiments polynuclear aromatic compounds. During an exemplary adsorption cycle, one adsorption unit 28a is adsorbing contaminants from the feed and producing treated aromatic-rich effluent stream discharged from outlet 38, while the other adsorption unit 28b is in the desorption cycle to desorb the previously adsorbed contaminants for removal in a discharge stream via an outlet 37. This discharge stream can be passed to an existing fuel oil pool, or to an existing cracking unit such as a hydrocracking unit, an FCC unit or a coking unit.

The adsorption treated aromatic-rich effluent from outlet 38 is passed to the isomerization reaction zone 30 along with hydrogen via inlet 39 for isomerization reactions over an isomerization catalyst, such as an acid catalyst.

The isomerized effluent via outlet 40, including isomerate, unreacted hydrogen and any light gases formed in isomerization reaction zone 30, is combined with the aromatic-lean fraction and the combined stream is passed to hydrotreating reaction zone 24 via inlet 42 along with a hydrogen feed via inlet 44 for contact with hydrotreating catalyst.

The resulting hydrocarbon stream via outlet 46 can be provided with an ultra-low level of organosulfur compounds, i.e., less than 15 ppmw, and in certain embodiments less than 10 ppmw, since substantially all of the aliphatic organosulfur compounds and thiophenes are labile under mild hydrotreating conditions, and sterically hindered multi-ring aromatic organosulfur compounds such as benzothiophenes and their derivatives that were present in the initial feed were separated into the aromatic-rich portion and converted to more reactive isomers that can be removed under mild hydrotreating conditions. This hydrotreated hydrocarbon product can be blended, used as a fuel or subjected to further downstream refinery operations.

The initial feedstock for use in above-described apparatus and process can be a crude or partially refined oil product obtained from various sources. The source of feedstock can be crude oil, synthetic crude oil, bitumen, oil sand, shale oil, coal liquids, or a combination including one of the foregoing sources. For example, the feedstock can be a straight run gas oil or other refinery intermediate stream such as vacuum gas oil, deasphalted oil and/or demetalized oil obtained from a solvent deasphalting process, light coker or heavy coker gas oil obtained from a coker process, cycle oil obtained from an FCC process, gas oil obtained from a visbreaking process, or any combination of the foregoing products. In certain embodiments, a suitable hydrocarbon feedstock is a straight run gas oil, a middle distillate fraction, or a diesel fraction, boiling in the range of from about 180° C. to about 450° C., in certain embodiments about 180° C. to about 400° C., and in further embodiments about 180° C. to about 370° C., typically containing up to about 2 W % sulfur and up to about 3,000 ppmw nitrogen. Nonetheless, one of ordinary skill in the art will appreciate that other hydrocarbon streams can benefit from the practice of the herein described system and method.

Adsorption zone 26 can include plural packed columns as adsorption units 28a, 28b, such that swing-mode adsorption occurs as is known to one of ordinary skill in the art. During an adsorption cycle, one adsorption unit is adsorbing contaminants from the feed and producing treated aromatic-rich effluent stream, while the other adsorption is in the desorption cycle to desorb the previously adsorbed contaminants for removal in a discharge stream (via an outlet 37). This discharge stream can be passed to an existing fuel oil pool, or to an existing cracking unit such as a hydrocracking unit, an FCC unit or a coking unit. When the adsorbent material in column 28a or 28b becomes saturated with adsorbed contaminants, the flow of the combined feedstream is directed to the other column. The adsorbed compounds are desorbed by heat or solvent treatment.

In case of heat desorption, heat is applied, for instance, with an inert nitrogen gas flow to the desorbed adsorption column. The desorbed compounds are removed from the adsorption columns 28a, 28b, for instance, via outlet 37 or other suitable outlet.

In the case of solvent desorption, fresh or recycled solvent is introduced to the adsorption zone. The solvent stream containing removed nitrogen-containing compounds and/or polynuclear aromatic compounds is discharged from adsorption zone 26 via outlet 37, and solvent can be recovered using flash or distillation separation.

Nitrogen-containing compounds and in certain embodiments polynuclear aromatic compounds are removed in adsorption zone 26 to increase the useful lifetime of the isomerization catalysts. For instance, basic nitrogen-containing compounds are removed as they tend to poison the acidic isomerization catalysts. Examples of these basic nitrogen-containing compounds targeted in the adsorption zone 26 include acridines, quinolines, anilines, quinoline, indole, carbazole, quinolin-2(1H)-one, and derivatives of any of the foregoing. In addition, other bulky nitrogen-containing compounds and any polynuclear aromatic compounds tend to fill in the adsorption sites, particularly at the relatively low temperature reaction conditions during isomerization reactions.

Basic nitrogen compounds have a tendency to strongly adsorb on the surface and in the pores of the isomerization catalyst. While desorption of these compounds is possible in the isomerization reaction zone, the reaction conditions during isomerization reactions, i.e., relatively low temperature, is less than that required to promote desorption of the nitrogen compounds during reaction, and hence they will "poison" the catalysts under isomerization reaction conditions. Aromatics, such as single ring and polynuclear aromatics including those having 2-4 rings and in hydrocarbon streams approximately at the diesel fraction, adsorb on the isomerization catalyst surface, but are less adsorptive than equivalent aromatic-content nitrogen compounds. That is, the relative adsorption coefficient for aromatic nitrogen-containing compounds is much higher than that of equivalent weight aromatic hydrocarbons. For instance, acridine (a three-ring nitrogen-containing aromatic-ring compound) has a ratio of adsorption constant value of 34 compared to anthracene (a three ring aromatic molecule without nitrogen heteroatoms) with a ratio of adsorption constant value of 0.

Adsorption conditions include temperatures in the range of from about 20° C. to about 400° C., in certain embodiments about 20° C. to about 300° C., and in further embodiments about 20° C. to about 200° C.; pressures in the range of from about 1 bar to about 50 bars, in certain embodiments about 1 bar to about 30 bars, and in further embodiments about 1 bar to about 10 bars; and liquid hourly space velocities (LHSV) in the range of from about 0.1 $h^{-1}$ to about 20 $h^{-1}$, in certain embodiments about 0.5 $h^{-1}$ to about 10 $h^{-1}$, and in further embodiments about 1.0 $h^{-1}$ to about 4 $h^{-1}$.

Suitable adsorbent materials include clays, synthetic zeolite, spent or regenerated refinery catalyst, activated carbon, silica-alumina, titania, porous ion-exchange resins or any material containing acidic sites. In certain embodiments, the solid adsorbent materials include silica, alumina, silica alumina, clay, or activated carbon.

Hydrotreating reaction zone 24 can be operated under mild conditions since sterically hindered sulfur-containing compounds are generally present in relatively low concentrations, if at all, in the combined stream to be desulfurized. As used herein, "mild" operating conditions are relative and the range of operating conditions depend on the feedstock being processed. These conditions are generally an operating temperature of 400° C. and below, a hydrogen partial pressure of 40 bars and below, and a hydrogen feed rate of 500 standard liters of hydrogen per liter of oil (SLt/Lt) and below. In certain embodiments of the process described herein, these mild operating conditions as used in conjunction with hydrotreating a mid-distillate stream, i.e., boiling in the range of from about 180° C. to about 370° C., include: a temperature in the range of from about 300° C. to about 400° C., and in certain embodiments about 320° C. to about 380° C.; a reaction pressure in the range of from about 20 bars to about 100 bars, and in certain embodiments about 30 bars to about 60 bars; a hydrogen partial pressure of below about 55 bars, and in certain embodiments in the range of from about 20 bars to about 40 bars; a liquid hourly space velocity (LHSV) feed rate in the range of from about 0.5 $h^{-1}$ to about 10 $h^{-1}$, and in certain embodiments about 1.0 $h^{-1}$ to about 4 $h^{-1}$; and a hydrogen feed rate in the range of from about 100 SLt/Lt to about 500 SLt/Lt, in certain embodiments about 100 SLt/Lt to about 300 SLt/Lt, and in further embodiments about 100 SLt/Lt to about 200 SLt/Lt.

The hydrotreating zone utilizes hydrotreating catalyst having one or more active metal components selected from the Periodic Table of the Elements Group VI, VII or VIIIB. In certain embodiments the active metal component is one or more of cobalt, nickel, tungsten and molybdenum, typically deposited or otherwise incorporated on a support, e.g., alumina, silica alumina, silica, or zeolites. In certain embodiments, the hydrotreating catalyst used in the first hydrotreating zone, i.e., operating under mild conditions, includes a combination of cobalt and molybdenum deposited on an alumina substrate.

The acid catalyst of isomerization reaction zone contains a solid acidic component having high acidity in terms of quantity and strength. While a range of acidity levels can be used to achieve the desired isomerization reactions, use of solid acid catalysts with higher acidity promotes undesirable cracking of hydrocarbons, particularly under elevated temperature conditions in isomerization reaction zone 30. It is noted that while quantitative measures for the acidity levels of catalysts vary, a suitable characterization that can be used is described in Hansford et al., "The Nature of Active Sites on Zeolites, VII. Relative Activities of Crystalline and Amorphous Alumino-Silicates," *Journal of Catalysis*, 1969, 13, 316-320, which is incorporated by reference herein. Briefly, the Hansford et al. reference describes a method to determine the rate constants for o-xylene isomerization to p-xylene- and xylene at 260° C. An acidity scale based on the relative first order rate constants was determined. While an in depth discussion is beyond the scope of the present description, the isomerization catalyst for use herein should possess an acidity of at least 15 times more than the acidity of amorphous silica-alumina catalyst at a temperature of 260° C. as determined from the isomerization test detailed in Hansford et al. For example, the rate constant for isomerization at 260° C. of o-xylene over silica alumina catalysts is 3.1, and the rate constant over HY zeolite is 48.8, thus the relative acidity of HY zeolite compared to silica alumina is 48.8/3.1, or 15.7.

Particular solid acid catalysts include one or more of zeolites, molecular sieves, crystalline or amorphous aluminosilicates, aluminophosphates, silicoaluminophosphates, sulfated zirconia, tungstated zirconia, niobic acid, supported heteropolyacids or derivatives thereof, or bulk heteropolyacids or derivatives thereof. In certain embodiments, effective solid acidic components include one or more zeolites or molecular sieves.

In addition, one or more solid acid components, for instance, as noted above, can be combined with a suitable porous binder or matrix material in a ratio of solid acid to binder of less than about 15:1, in certain embodiments less than about 10:1, in additional embodiments less than about 5:1, and in further embodiments about 2:1. The binder or matrix material can be selected from one or more of active and inactive materials such as clays (e.g., montmorillonite and kaolin), silica, and/or metal oxides such as alumina. In certain embodiments, the porous matrix or binder material includes silica, alumina, or kaolin clay. In additional embodiments, an alumina binder material is used.

The isomerization reaction zone 30 can include one or more reactors or reaction zones with one or more catalyst beds of the same or different isomerization catalyst. In certain embodiments, fixed bed reactors are employed. In other embodiments, fluidized beds, ebullating beds, slurry beds, and moving beds can be used.

The isomerization reaction zone 30 is operated under suitable conditions to isomerize at least a portion of the alkyl groups present in sterically hindered sulfur-containing compounds to form more reactive sulfur-containing compound. Targeted sulfur-containing compounds include 4,6-dimethyl-dibenzothiophene. These sterically hindered compounds are typically not desulfurized in hydrotreating reactors under mild conditions. Isomerization reaction zone conditions include temperatures in the range of from about 100° C. to about 400° C., in certain embodiments about 150° C. to about 350° C., and in further embodiments about 200° C. to about 300° C.; pressures in the range of from about 1 bar to about 80 bars, in certain embodiments about 1 bar to about 50 bars, and in further embodiments about 1 bar to about 30 bars; liquid hourly space velocities in the range of from about 0.5 $h^{-1}$ to about 8 $h^{-1}$, in certain embodiments about 0.5 $h^{-1}$ to about 5 $h^{-1}$, and in further embodiments about 0.5 $h^{-1}$ to about 2 $h^{-1}$; and a hydrogen feed rate in the range of from about 100 SLt/Lt to about 1000 SLt/Lt, in certain embodiments about 100 SLt/Lt to about 500 SLt/Lt, in further embodiments about 100 SLt/Lt to about 200 SLt/Lt.

The aromatic separation apparatus is generally based on selective aromatic extraction. For instance, the aromatic separation apparatus can be a suitable solvent extraction aromatic separation apparatus capable of partitioning the feed into a generally aromatic-lean stream and a generally aromatic-rich stream. Systems including various established aromatic extraction processes and unit operations used in other stages of various refinery and other petroleum-related operations can be employed as the aromatic separation apparatus described herein. In certain existing processes, it is desirable to remove aromatics from the end product, e.g., lube oils and certain fuels, e.g., diesel fuel. In other processes, aromatics are extracted to produce aromatic-rich products, for instance, for use in various chemical processes and as an octane booster for gasoline.

Figure 3:
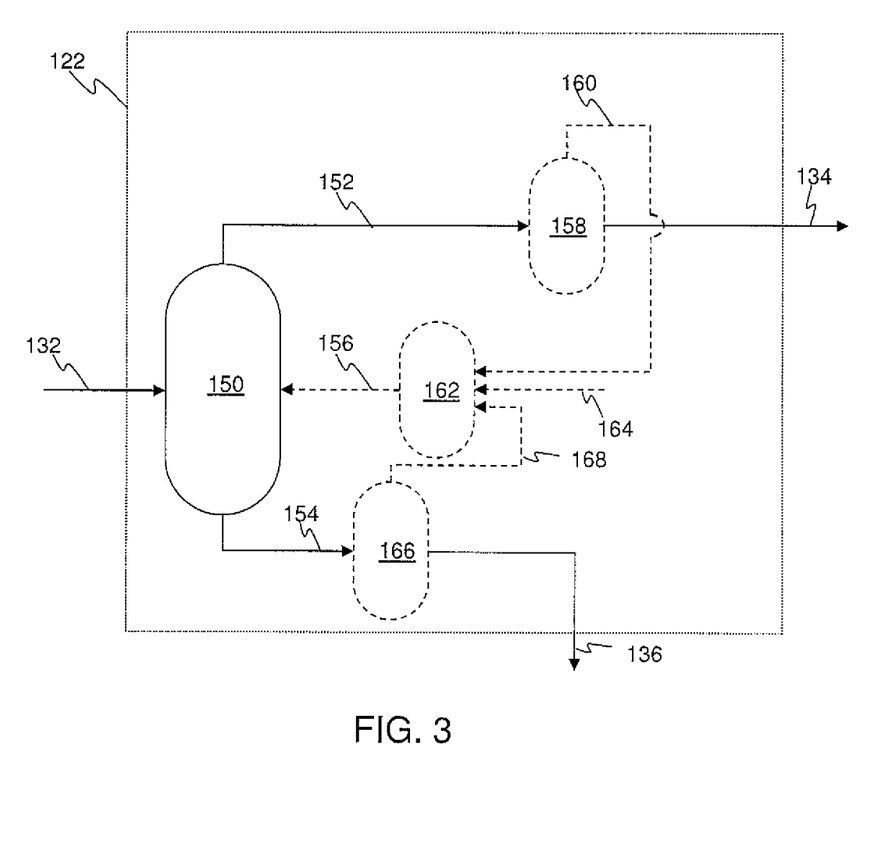
FIG. 3 is a schematic diagram of an aromatic separation zone.

As shown in FIG. 3, an aromatic separation apparatus 122 can include suitable unit operations to perform a solvent extraction of aromatics, and recover solvents for reuse in the process. A feed 132 is conveyed to an aromatic extraction vessel 150 in which an aromatic-lean fraction is separated as a raffinate stream 152 from an aromatic-rich fraction as an extract stream 154. A solvent feed 156 is introduced into aromatic extraction vessel 150.

A portion of the extraction solvent can also exist in stream 152, e.g., in the range of from about 0 W % to about 15 W % (based on the total amount of stream 152), in certain embodiments less than about 8 W %. In operations in which the solvent existing in stream 152 exceeds a desired or predetermined amount, solvent can be removed from the hydrocarbon product, for example, using a flashing or stripping unit 158, or other suitable apparatus. Solvent 160 from a flashing unit 158 can be recycled to the aromatic extraction vessel 150, e.g., via a surge drum 162. Initial solvent feed or make-up solvent can be introduced via stream 164. An aromatic-lean stream 136 is discharged from the flashing unit 158.

In addition, a portion of the extraction solvent can also exist in stream 154, e.g., in the range of from about 70 W % to about 98 W % (based on the total amount of stream 154), preferably less than about 85 W %. In embodiments in which solvent existing in stream 154 exceeds a desired or predetermined amount, solvent can be removed from the hydrocarbon product, for example, using a flashing or stripping unit 166 or other suitable apparatus. Solvent 168 from the flashing unit 166 can be recycled to the aromatic extraction vessel 150, e.g., via the surge drum 162. An aromatic-rich stream 138 is discharged from the flashing unit 166.

Selection of solvent, operating conditions, and the mechanism of contacting the solvent and feed permit control over the level of aromatic extraction. For instance, suitable solvents include furfural, N-methyl-2-pyrrolidone, dimethylformamide, dimethylsulfoxide, phenol, nitrobenzene, sulfolanes, acetonitrile, furfural, or glycols and can be provided in a solvent to oil ratio of about 20:1, in certain embodiments about 4:1, and in further embodiments about 1:1. Suitable glycols include diethylene glycol, ethylene glycol, triethylene glycol, tetraethylene glycol and dipropylene glycol. The extraction solvent can be a pure glycol or a glycol diluted with from about 2 to 10 W % water. Suitable sulfolanes include hydrocarbon-substituted sulfolanes (e.g., 3-methyl sulfolane), hydroxy sulfolanes (e.g., 3-sulfolanol and 3-methyl-4-sulfolanol), sulfolanyl ethers (e.g., methyl-3-sulfolanyl ether), and sulfolanyl esters (e.g., 3-sulfolanyl acetate).

The aromatic separation apparatus can operate at a temperature in the range of from about 20° C. to about 200° C., and in certain embodiments about 40° C. to about 80° C. The operating pressure of the aromatic separation apparatus can be in the range of from about 1 bar to about 10 bars, and in certain embodiments about 1 bar to 3 bars. Types of apparatus useful as the aromatic separation apparatus in certain embodiments of the system and process described herein include stage-type extractors or differential extractors.

Figure 4:
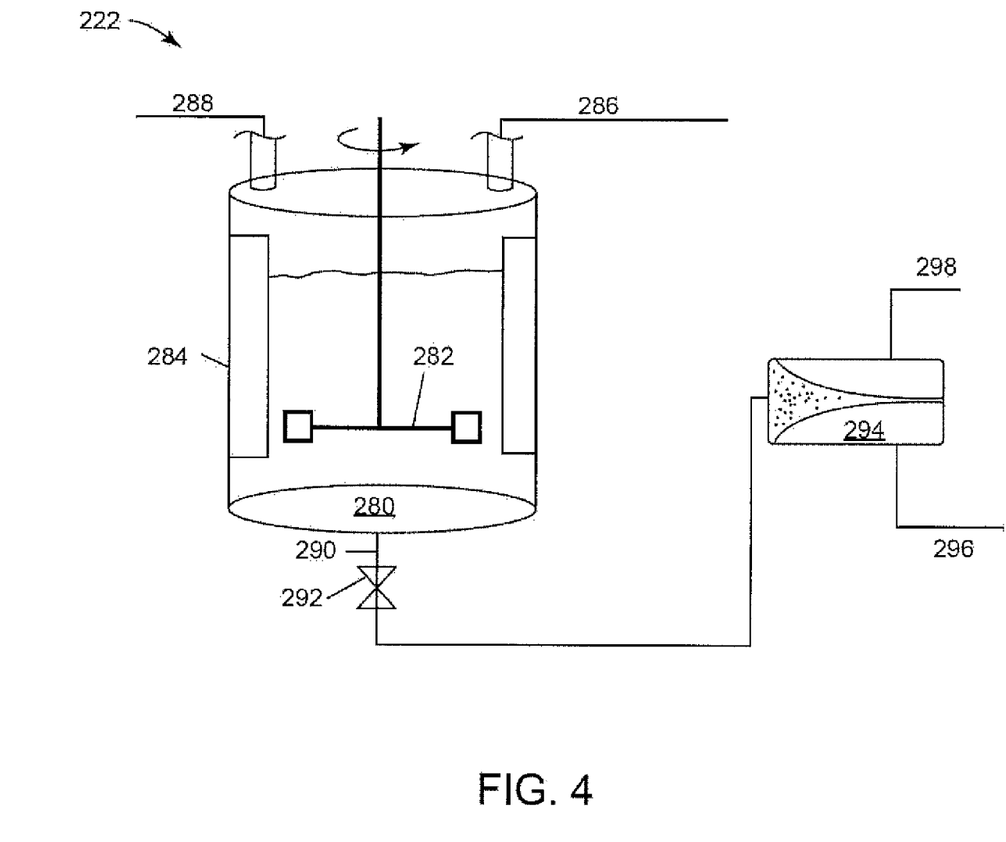
FIGS. 4-9 show various examples of apparatus suitable for use as the aromatic extraction zone.

An example of a stage-type extractor is a mixer-settler apparatus 222 schematically illustrated in FIG. 4. Mixer-settler apparatus 222 includes a vertical tank 280 incorporating a turbine or a propeller agitator 282 and one or more baffles 284. Charging inlets 286, 288 are located at the top of tank 280 and outlet 290 is located at the bottom of tank 280. The feedstock to be extracted is charged into vessel 280 via inlet 286 and a suitable quantity of solvent is added via inlet 288. The agitator 282 is activated for a period of time sufficient to cause intimate mixing of the solvent and charge stock, and at the conclusion of a mixing cycle, agitation is halted and, by control of a valve 292, at least a portion of the contents are discharged and passed to a settler 294. The phases separate in the settler 294 and a raffinate phase containing an aromatic-lean hydrocarbon mixture and an extract phase containing an aromatic-rich mixture are withdrawn via outlets 296 and 298, respectively. In general, a mixer-settler apparatus can be used in batch mode, or a plurality of mixer-settler apparatus can be staged to operate in a continuous mode.

Another stage-type extractor is a centrifugal contactor. Centrifugal contactors are high-speed, rotary machines characterized by relatively low residence time. The number of stages in a centrifugal device is usually one, however, centrifugal contactors with multiple stages can also be used. Centrifugal contactors utilize mechanical devices to agitate the mixture to increase the interfacial area and decrease the mass transfer resistance.

Various types of differential extractors (also known as "continuous contact extractors") that are also suitable for use as an aromatic extraction apparatus in zone 22 include, but are not limited to, centrifugal contactors and contacting columns such as tray columns, spray columns, packed towers, rotating disc contactors and pulse columns.

Contacting columns are suitable for various liquid-liquid extraction operations. Packing, trays, spray or other droplet-formation mechanisms or other apparatus are used to increase the surface area in which the two liquid phases (i.e., a solvent phase and a hydrocarbon phase) contact, which also increases the effective length of the flow path. In column extractors, the phase with the lower viscosity is typically selected as the continuous phase, which, in the case of an aromatic extraction apparatus, is the solvent phase. In certain embodiments, the phase with the higher flow rate can be dispersed to create more interfacial area and turbulence. This is accomplished by selecting an appropriate material of construction with the desired wetting characteristics. In general, aqueous phases wet metal surfaces and organic phases wet non-metallic surfaces. Changes in flows and physical properties along the length of an extractor can also be considered in selecting the type of extractor and/or the specific configuration, materials or construction, and packing material type and characteristics (i.e., average particle size, shape, density, surface area, and the like).

Figure 5:
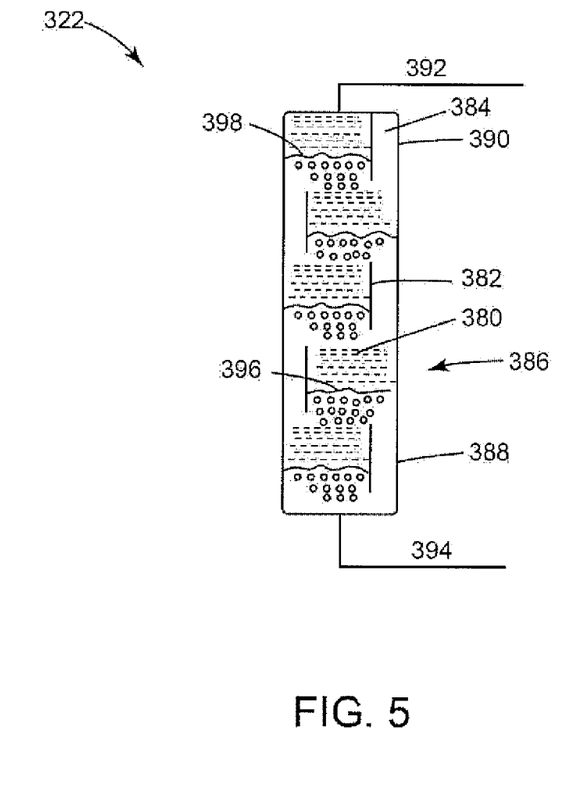

A tray column 322 is schematically illustrated in FIG. 5. A light liquid inlet 388 at the bottom of column 322 receives liquid hydrocarbon, and a heavy liquid inlet 390 at the top of column 322 receives liquid solvent. Column 322 includes a plurality of trays 380 and associated downcomers 382. A top level baffle 384 physically separates incoming solvent from the liquid hydrocarbon that has been subjected to prior extraction stages in the column 322. Tray column 322 is a multi-stage counter-current contactor. Axial mixing of the continuous solvent phase occurs at region 386 between trays 380, and dispersion occurs at each tray 380 resulting in effective mass transfer of solute into the solvent phase. Trays 380 can be sieve plates having perforations ranging from about 1.5 to 4.5 mm in diameter and can be spaced apart by about 150-600 mm.

Light hydrocarbon liquid passes through the perforation in each tray 380 and emerges in the form of fine droplets. The fine hydrocarbon droplets rise through the continuous solvent phase and coalesce into an interface layer 396 and are again dispersed through the tray 380 above. Solvent passes across each plate and flows downward from tray 380 above to the tray 380 below via downcomer 382. The principle interface 398 is maintained at the top of column 322. Aromatic-lean hydrocarbon liquid is removed from outlet 392 at the top of column 322 and aromatic-rich solvent liquid is discharged through outlet 394 at the bottom of column 322. Tray columns are efficient solvent transfer apparatus and have desirable liquid handling capacity and extraction efficiency, particularly for systems of low-interfacial tension.

Figure 6:
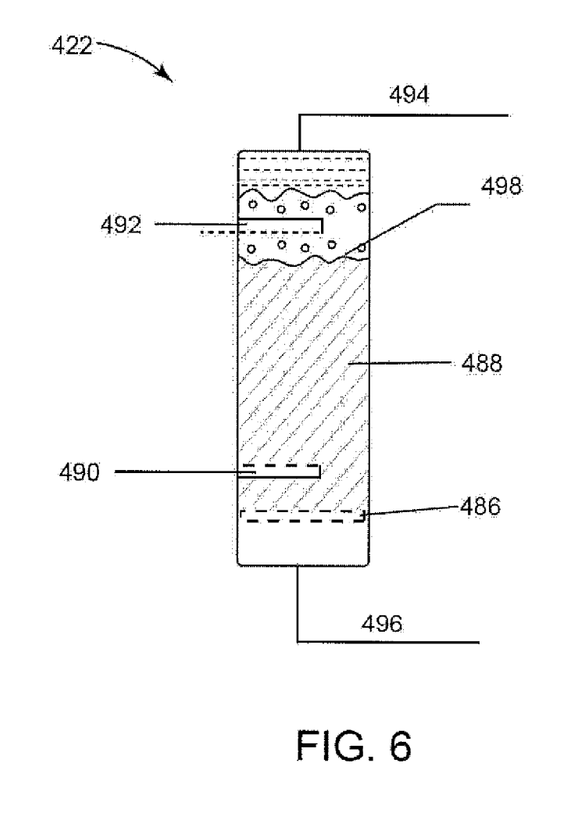

An additional type of unit operation suitable for extracting aromatics from the hydrocarbon feed is a packed bed column. FIG. 6 is a schematic illustration of a packed bed column 422 having a hydrocarbon inlet 490 and a solvent inlet 492. A packing region 488 is provided upon a support plate 486. Packing region 488 comprises suitable packing material including, but not limited to, Pall rings, Raschig rings, Kascade rings, Intalox saddles, Berl saddles, super Intalox saddles, super Berl saddles, Demister pads, mist eliminators, telerrettes, carbon graphite random packing, other types of saddles, and the like, including combinations of one or more of these packing materials. The packing material is selected so that it is fully wetted by the continuous solvent phase. The solvent introduced via inlet 492 at a level above the top of the packing region 488 flows downward and wets the packing material and fills a large portion of void space in the packing region 488. Remaining void space is filled with droplets of the hydrocarbon liquid which rise through the continuous solvent phase and coalesce to form the liquid-liquid interface 498 at the top of the packed bed column 422. Aromatic-lean hydrocarbon liquid is removed from outlet 494 at the top of column 422 and aromatic-rich solvent liquid is discharged through outlet 496 at the bottom of column 422. Packing material provides large interfacial areas for phase contacting, causing the droplets to coalesce and reform. The mass transfer rate in packed towers can be relatively high because the packing material lowers the recirculation of the continuous phase.

Figure 7:
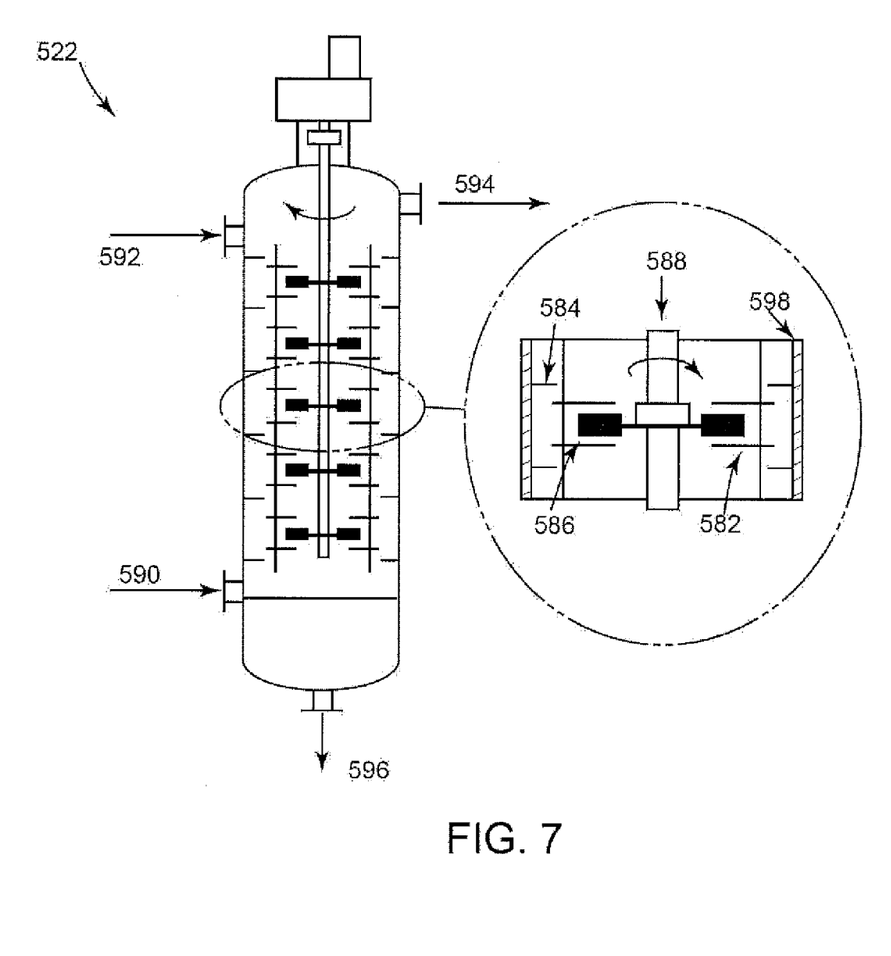

Further types of apparatus suitable for aromatic extraction in the system and method herein include rotating disc contactors. FIG. 7 is a schematic illustration of a rotating disc contactor 522 known as a Scheibel® column commercially available from Koch Modular Process Systems, LLC of Paramus, N.J., USA. It will be appreciated by those of ordinary skill in the art that other types of rotating disc contactors can be implemented as an aromatic extraction unit included in the system and method herein, including but not limited to Oldshue-Rushton columns, and Kuhni extractors. The rotating disc contactor is a mechanically agitated, counter-current extractor. Agitation is provided by a rotating disc mechanism, which typically runs at much higher speeds than a turbine type impeller as described with respect to FIG. 4.

Rotating disc contactor 522 includes a hydrocarbon inlet 590 toward the bottom of the column and a solvent inlet 592 proximate the top of the column, and is divided into number of compartments formed by a series of inner stator rings 582 and outer stator rings 584. Each compartment contains a centrally located, horizontal rotor disc 586 connected to a rotating shaft 588 that creates a high degree of turbulence inside the column. The diameter of the rotor disc 586 is slightly less than the opening in the inner stator rings 582. Typically, the disc diameter is 33-66% of the column diameter. The disc disperses the liquid and forces it outward toward the vessel wall 598 where the outer stator rings 584 create quiet zones where the two phases can separate. Aromatic-lean hydrocarbon liquid is removed from outlet 594 at the top of column 522 and aromatic-rich solvent liquid is discharged through outlet 596 at the bottom of column 522. Rotating disc contactors advantageously provide relatively high efficiency and capacity and have relatively low operating costs.

Figure 8:
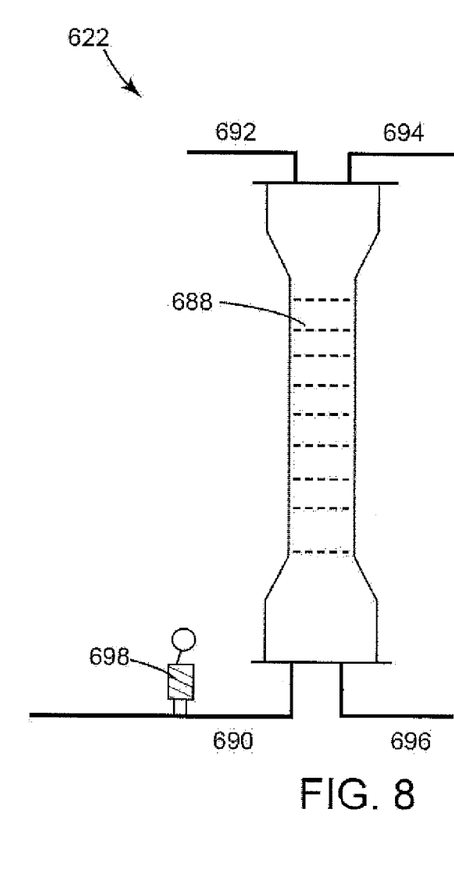

An additional type of apparatus suitable for aromatic extraction in the system and method herein is a pulse column. FIG. 8 is a schematic illustration of a pulse column system 622, which includes a column with a plurality of packing or sieve plates 688, a light phase, i.e., solvent, inlet 690, a heavy phase, i.e., hydrocarbon feed, inlet 692, a light phase outlet 694 and a heavy phase outlet 696.

In general, pulse column system 622 is a vertical column with a large number of sieve plates 688 lacking down corners. The perforations in the sieve plates 688 typically are smaller than those of non-pulsating columns, e.g., about 1.5 mm to 3.0 mm in diameter.

A pulse-producing device 698, such as a reciprocating pump, pulses the contents of the column at frequent intervals. The rapid reciprocating motion, of relatively small amplitude, is superimposed on the usual flow of the liquid phases. Bellows or diaphragms formed of coated steel (e.g., coated with polytetrafluoroethylene), or any other reciprocating, pulsating mechanism can be used. A pulse amplitude of 5-25 mm is generally recommended with a frequency of 100-260 cycles per minute. The pulsation causes the light liquid (solvent) to be dispersed into the heavy phase (oil) on the upward stroke and heavy liquid phase to jet into the light phase on the downward stroke. The column has no moving parts, low axial mixing, and high extraction efficiency.

Figure 9:
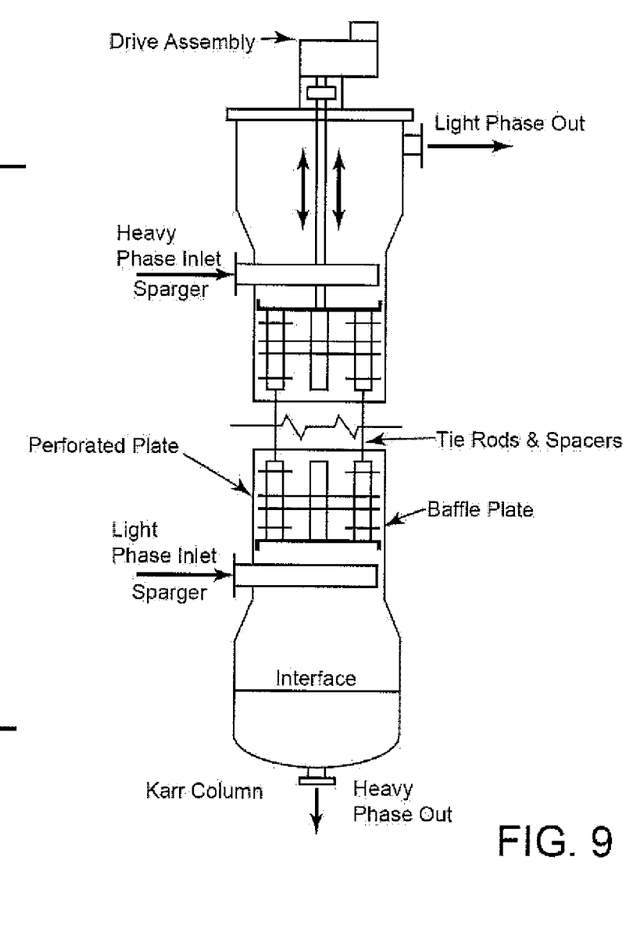

A pulse column typically requires less than a third the number of theoretical stages as compared to a non-pulsating column. A specific type of reciprocating mechanism is used in a Karr Column which is shown in FIG. 9.

The addition of an aromatic separation zone into the apparatus and process described herein uses relatively low cost units as well as more favorable operating conditions in the hydrodesulfurization zone, i.e., milder pressure and temperature and reduced hydrogen consumption. Only the aromatic-rich fraction is subjected to the isomerization reactions to convert the sterically hindered sulfur-containing compounds. Further, in embodiments in which an adsorption zone is used, only the aromatic-rich fraction is subjected to the adsorption zone. This results in more cost-effective desulfurization of hydrocarbon fuels, particularly removal of the refractory, sterically hindered sulfur-containing compounds, thereby efficiently and economically achieving ultra-low sulfur content fuel products.

Distinct advantages are offered by the apparatus and processes described herein when compared to conventional processes for deep desulfurization of hydrocarbon fuel. For example, in certain conventional approaches to deep desulfurization, the entire hydrocarbon stream undergoes adsorption, isomerization and hydrodesulfurization, requiring unit operations of a capacity suitable for the full feedstream for all processes. Furthermore, undesired side reactions during isomerization reactions that can negatively impact certain desired fuel characteristics are avoided for a portion of the initial feed. In addition, in embodiments in which an adsorption zone is required, operating costs associated with the adsorption of nitrogen-containing and polynuclear aromatic compounds from the entire feedstream are decreased as only the aromatic-rich portion of the initial feed is subjected to adsorption.

As the herein described example demonstrates, very low severity hydrotreating operating conditions can be applied yet the product still contains less than 10 ppmw sulfur compounds. By separating gas oil into an aromatic-rich fraction and an aromatic-lean fraction, and treating the aromatic-rich fraction containing refractory sulfur compounds in adsorptive and isomerization steps, the hydrotreating unit can be operated under very mild conditions, i.e. hydrogen partial pressures of less than 30 bars, liquid hourly space velocity of 1 $h^{-1}$ and hydrogen feed rate of 300 SLt/Lt. If the same stream is to be treated in a single hydrotreating unit, the pressure and/or catalyst volume must be increased to achieve desulfurization levels as shown herein. For example, a hydrotreating pilot plant study conducted with gas oil derived from Arab light crude oil at 30 bars of hydrogen partial pressure and 350° C., showed the relative catalyst requirement for 500 ppmw and 10 ppmw sulfur gas oil products to be 1 and 4.9, respectively.

Example

An apparatus was constructed including various unit operations and streams in an arrangement similar to that described with respect to FIG. 2, therefore corresponding reference numbers are used.

A hydrocarbon stream 32 was extracted in an extractor 22. The extractor 22 was a furfural extraction using countercurrent extraction method and was operated at 60° C., atmospheric pressure at a solvent to diesel ratio of 1.1:1.0. Two fractions, an aromatic rich fraction 36 and an aromatic lean fraction 34, were obtained by this solvent extraction process. The yield of the aromatic lean fraction 34 was 68.5 W % and was characterized by a sulfur concentration of 2,734 ppmw, a nitrogen concentration of 37 ppmw and an aromatic concentration of 11.3 W %. The yield of the aromatic rich fraction 36 was 31.5 W % and was characterized by an aromatic concentration of 80 W %, a sulfur concentration of 10,000 ppmw and a nitrogen concentration of 141 ppmw.

The aromatic rich fraction 36 was conveyed to an adsorption column 26 operating under conditions effective to remove the nitrogen compounds, in this case at a temperature of 25° C., a pressure of 1 bar, and a liquid hourly space velocity of 2 $h^{-1}$. Attapulgus clay with surface area of 108 $m^2/g$ and pore volume of 0.392 $cm^3/g$ was used as adsorbent material. The adsorption process yielded 98.6 W % of a treated aromatic-rich effluent stream 38 (denitrogenized gas oil) having a nitrogen concentration of 24 ppmw of nitrogen and a sulfur concentration of 9984 ppmw, and 1.4 W % of an adsorption discharge stream 37 (reject fraction) having a nitrogen concentration of 1.29 W %.

The denitrogenized gas oil 38 was subjected to isomerization and hydrodesulfurization. The isomerization unit 30, a fixed-bed reactor, was operated at a temperature of 300° C., a pressure of 30 bars, a liquid hourly space velocity of 0.5 $h^{-1}$, and a rate of hydrogen gas feed 39 of 100 SLt/Lt of oil. Isomerization unit 30 contained zinc impregnated Y-zeolite catalyst. Y-type zeolite was obtained as H-exchanged Y. Zn was exchanged by using Zn acetate with conventional ion exchange method. The refractory sulfur present in the denitrogenized heavy gas oil was isomerized, characterized by a comparison of sulfur speciation of the feedstock and product.

The cleaned isomerized heavy gas oil (isomerized stream 40) and the aromatic lean fraction 34 were combined into a stream 42 and hydrotreated in a hydrotreating vessel 24, a fixed-bed reactor using plug-flow kinetics, using an alumina catalyst promoted with cobalt and molybdenum metals at 30 $Kg/cm^2$ hydrogen partial pressure at the reactor outlet, a weighted average bed temperature of 335° C., a liquid hourly space velocity of 1.0 $h^{-1}$ and a hydrogen gas feed 44 of 300 SLt/Lt of oil. The sulfur content of the desulfurized and denitrogenized product stream 46 was reduced to 10 ppmw.

Table 2 shows the characteristics of the SR gas oil 32, aromatic lean fraction 34, aromatic rich fraction 36 and desulfurized gas oil 46.

TABLE 2

|  |  |  | SR Gas Oil | Aromatic Lean | Aromatic Rich Stream | Desulfurized Gas Oil |
|---|---|---|---|---|---|---|
|  |  |  | 32 | 34 | 36 | 46 |
|  |  |  |  |  | Yield |  |
|  |  |  | 100 | 68.5 | 31.5 |  |
| Density @ 15.6° C. | Kg/Lt | ASTM D4052 | 0.850 | 0.844 | 0.917 | 0.847 |
| SULFUR | W % (ppmw) | ASTM D4294 | 1.3 | 0.27 | 1.03 | (<10) |
| NITROGEN | ppmw |  | 178 | 37 | 141 | <1 |
| Aromatics | W % |  | 31.5 | 10.5 |  |  |
| Paraffins + Naphthenes | W % |  | 68.5 | 89.5 |  |  |
| IBP | ° C. | ASTM D2887 | 52 | 53 | 62 |  |
| 5 W % | ° C. | ASTM D2887 | 186 | 187 | 194 |  |
| 10 W % | ° C. | ASTM D2887 | 215 | 213 | 225 | 210 |
| 30 W % | ° C. | ASTM D2887 | 267 | 262 | 279 | 260 |
| 50 W % | ° C. | ASTM D2887 | 304 | 299 | 316 | 300 |
| 70 W % | ° C. | ASTM D2887 | 344 | 338 | 360 | 340 |
| 90 W % | ° C. | ASTM D2887 | 403 | 397 | 425 | 400 |
| 95 W % | ° C. | ASTM D2887 | 426 | 420 | 452 | 430 |
| 100 W % | ° C. | ASTM D2887 | 466 | 463 | 504 |  |

The overall material balance for the overall process is given in Table 3.

TABLE 3

| Stream | Flow, Kg/h | Sulfur, ppmw | Nitrogen, ppmw |
|---|---|---|---|
| 32 Gas oil | 1000.00 | 10266 | 178 |
| 34 Aromatic lean gas oil | 685.00 | 2733 | 37 |
| 36 Aromatic rich gas oil | 315.00 | 10267 | 140 |
| 38 Denitrogenized gas oil | 310.62 | 9980 | 24 |
| 37 Nitrogen rich gas oil | 4.38 | 45000 | 12971 |
| 39 Hydrogen | 2.64 |  |  |
| 40 Isomerate | 313.26 | 9980 | 24 |
| 42 Combined gas oil | 998.26 | 5020 | 33 |
| 44 Hydrogen | 25.46 |  |  |
| 46 Clean gas oil | 1023.72 | <10 | <1 |

The method and system herein have been described above and in the attached drawings; however, modifications will be apparent to those of ordinary skill in the art and the scope of protection for the invention is to be defined by the claims that follow.

I claim:

1. A method of processing a hydrocarbon feed to reduce the concentration of undesired organosulfur compounds comprising:
   separating, by aromatic extraction, the hydrocarbon feed into an aromatic-lean fraction that contains labile organosulfur compounds and an aromatic-rich fraction that contains sterically hindered refractory aromatic organosulfur compounds;
   contacting the aromatic-rich fraction with an isomerization catalyst in the presence of hydrogen to remove steric hindrance of certain organosulfur compounds and produce an isomerized effluent including organosulfur isomerate and any remaining unreacted hydrogen;
   subjecting the aromatic-lean fraction and the isomerized effluent to a mild hydrotreating process to thereby reduce the sulfur content; and
   recovering a hydrotreated hydrocarbon product.

2. The method of claim 1, further comprising, prior to contacting the aromatic-rich fraction with an isomerization catalyst, contacting the aromatic-rich fraction with an adsorbent material to reduce the nitrogen content to produce an adsorption effluent.

3. The method of claim 1, wherein aromatic extraction comprises:
   subjecting the hydrocarbon feed and an effective quantity of extraction solvent to an extraction zone to produce an extract containing a major proportion of the aromatic content of the hydrocarbon feed and a portion of the extraction solvent and
   a raffinate containing a major proportion of the non-aromatic content of the hydrocarbon feed and a portion of the extraction solvent;
   separating at least substantial portion of the extraction solvent from the raffinate and passing the aromatic-lean fraction to the mild hydrotreating process; and
   separating at least substantial portion of the extraction solvent from the extract and passing the aromatic-rich fraction as a hydrotreated hydrocarbon product to the step of contacting the aromatic-rich fraction with isomerization catalyst.

4. The method of claim 1, wherein the aromatic-lean fraction includes aliphatic organosulfur compounds.

5. The method of claim 4, wherein the aliphatic organosulfur compounds include sulfides, disulfides, mercaptans or combinations comprising at least one of the foregoing aliphatic organosulfur compounds.

6. The method of claim 1, wherein the aromatic-rich fraction includes benzothiophene, alkylated derivatives of benzothiophene, dibenzothiophene, alkyl derivatives of dibenzothiophene, benzonaphtenothiophene, alkyl derivatives of benzonaphtenothiophene or combinations comprising at least one of the foregoing aromatic organosulfur compounds.

7. The method of claim 1, wherein the aromatic-rich fraction includes aromatic nitrogen compounds including pyrrole, quinoline, acridine, carbazole, their derivatives or combinations comprising at least one of the foregoing aromatic nitrogen compounds.

8. The method of claim 2, wherein the step of contacting the aromatic-rich fraction with an adsorbent material comprises
   a. passing the aromatic-rich fraction through a first of two packed columns;
   b. transferring the aromatic-rich fraction from the first column to the second column while discontinuing passage through the first column;
   c. desorbing and removing nitrogen-containing compounds and/or polynuclear aromatic compounds from the adsorbent material in the first column to thereby regenerate the adsorbent material;
   d. transferring the aromatic-rich fraction from the second column to the first column while discontinuing the flow through the second column;
   e. desorbing and removing nitrogen-containing compounds and/or polynuclear aromatic compounds from the adsorbent material in the second column to thereby regenerate the adsorbent material; and
   f. repeating steps (a)-(e), whereby the processing of the aromatic-rich fraction is continuous.

9. The method of claim 2, wherein
the hydrocarbon feed is straight run gas oil boiling in the range of from about 180° C. to about 450° C. containing in the range of from about 0.05 weight % to about 2 weight % sulfur and in the range of from about 10 ppmw to about 3,000 ppmw nitrogen;
operating conditions in the mild hydrotreating process include a hydrogen partial pressure in the range of from about 20 bars to about 40 bars, a temperature in the range of from about 320° C. to about 380° C. and a hydrogen feed rate in the mild hydrotreating process in the range of from about 200 liters of hydrogen (normalized) per liter of oil to about 300 liters of hydrogen (normalized) per liter of oil,
the sulfur content of the hydrotreated hydrocarbon product is less than about 15 ppmw; and
the nitrogen content of the hydrotreated hydrocarbon product is less than about 10 ppmw.

10. The method of claim 1, wherein the isomerization catalyst possesses an acidity of at least 15 times more than the acidity of amorphous silica-alumina catalyst at a temperature of 260° C.

11. The method of claim 1, wherein the step of contacting the high boiling temperature fraction with an isomerization catalyst occurs at a temperature in the range of about 150° C. to about 350° C.

* * * * *